United States Patent
Ohnishi

(10) Patent No.: US 7,127,113 B2
(45) Date of Patent: Oct. 24, 2006

(54) IMAGE PROCESSING METHOD, STORAGE MEDIUM, IMAGE FORMING APPARATUS AND PROGRAM WITH CORRECTION PROCESSING ACCORDING TO AN ATTRIBUTE OF AN IMAGE

(75) Inventor: Yoshinari Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

(21) Appl. No.: 09/987,229

(22) Filed: Nov. 14, 2001

(65) Prior Publication Data

US 2002/0061139 A1    May 23, 2002

(30) Foreign Application Priority Data

Nov. 17, 2000   (JP)   ............................. 2000-351240

(51) Int. Cl.
   *G06K 9/36*   (2006.01)

(52) U.S. Cl. ...................................... 382/233; 382/239

(58) Field of Classification Search ................ 382/232, 382/233, 234, 239, 176, 180, 173; 358/1.18, 358/1.16, 1.15, 3.03, 426.02, 426.01, 426.12; 707/101
See application file for complete search history.

(56) References Cited

U.S. PATENT DOCUMENTS

| | | | | |
|---|---|---|---|---|
| 5,539,865 A | * | 7/1996 | Gentile | ...................... 358/1.16 |
| 6,009,209 A | * | 12/1999 | Acker et al. | ................ 382/275 |
| 6,124,944 A | * | 9/2000 | Ohta | .......................... 358/1.9 |
| 6,493,028 B1 | * | 12/2002 | Anderson et al. | ........ 348/222.1 |

FOREIGN PATENT DOCUMENTS

JP          08278876 A  * 10/1996

* cited by examiner

*Primary Examiner*—Wenpeng Chen
(74) *Attorney, Agent, or Firm*—Fitzpatrick, Cella, Harper & Scinto

(57) ABSTRACT

The present invention aims to enable image attribute discrimination of an image indicative of compressed data, and hence correction processing on the image indicative of the compressed data. In attaining this aim, the compressed data are developed into a bit map by a method corresponding to the analysis results so that the correction processing will be performed on the bit map according to the identified attribute.

12 Claims, 7 Drawing Sheets

PRINT SAMPLE

ATTRIBUTE AND DATA FORMAT

| IMAGE | TEXT | GRAPHICS |
|---|---|---|
| JPEG<br>TIFF<br>EXIF | RLE | PNG<br>GIF |

| VOLUME INFORMATION |
| --- |
| DIRECTORY INFORMATION |
| IMAGE PROCESSING METHOD CONTROL PROGRAM EXECUTION FILE |
| IMAGE PROCESSING METHOD CONTROL PROGRAM RELATED DATA FILE |

| BASIC I/O PROGRAM |
| --- |
| OS |
| IMAGE PROCESSING METHOD CONTROL PROGRAM |
| RELATED DATA |
| WORK AREA |

IMAGE PROCESSING METHOD, STORAGE MEDIUM, IMAGE FORMING APPARATUS AND PROGRAM WITH CORRECTION PROCESSING ACCORDING TO AN ATTRIBUTE OF AN IMAGE

BACKGROUND OF THE INVENTION

1. Field of the Invention

The present invention relates to an image processing method, a storage medium, an image forming apparatus and a program, all of which are to perform correction processing according to the attribute of an image.

2. Related Background Art

Conventionally, there is known color processing which is controlled according to the attribute of an image.

In the conventional technology, however, single color processing (color correction, color conversion and binarization or other n-valued processing) is performed on a bit map obtained by decompressing compressed data. For this reason, color processing suitable for the attribute of the expanded bit map cannot be performed on the compressed data.

The latest driver can switch color processing by analyzing color data developed into a bit map obtained by decompressing compressed data, but it has the disadvantage of notably reducing the processing speed because of the load involved in the processing for analyzing the data after it has been developed into the bit map.

SUMMARY OF THE INVENTION

It is an object of the present invention to resolve the above-mentioned disadvantage, and to enable image attribute discrimination of an image indicative of compressed data, and hence correction processing on the image indicative of the compressed data.

The present invention has been made in view of the above-mentioned point. According to the present application, there is provided an image processing method for performing correction processing according to an attribute of an image, comprising the steps of: analyzing compressed data contained in a drawing instruction to determine whether its attribute is text, image or graphics; developing the compressed data to a bit map using a method corresponding to an analysis result obtained in said analyzing step; and performing correction processing on the bit map according to the attribute of the image identified on the basis of the analysis result.

Other characteristics of the present invention will become apparent from the following description of the preferred embodiment and the accompanying drawings.

DESCRIPTION OF THE PREFERRED EMBODIMENTS (Embodiment 1)

Hereinbelow, an embodiment of the present invention will be described in detail with reference to the accompanying drawings.

Figure 1:
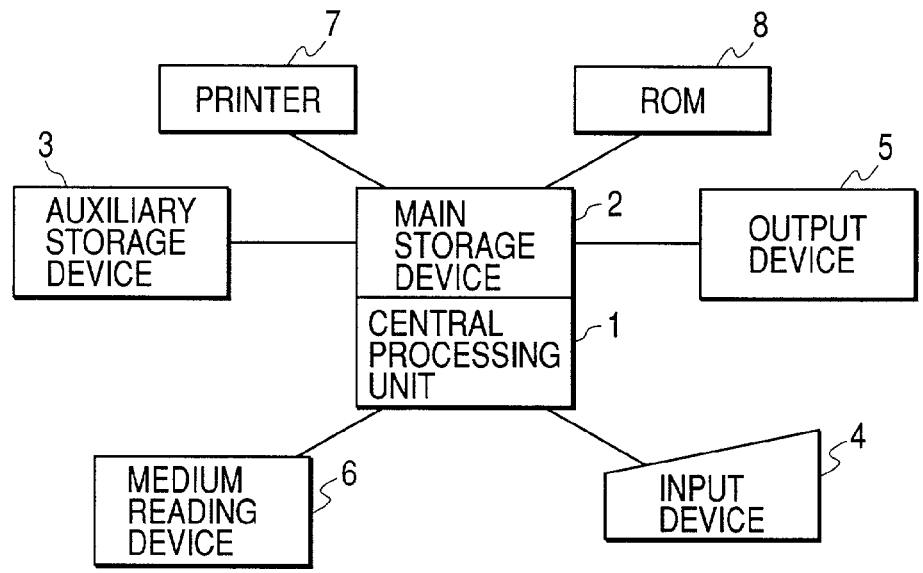
FIG. 1 is a block diagram showing a configuration of an information processing system to which an image processing/printing method according to an embodiment is applied.

FIG. 1 is a block diagram showing a configuration of an information processing system to which an image processing/printing method according to the present embodiment is applied.

In FIG. 1, a central processing unit 1 reads the program and related data stored in a storage medium such as an FD, a CD-ROM (compact disk read-only memory) or an IC (integrated circuit) memory card from a medium reading device 6 connected to the system. A ROM (read-only memory) 8 is also provided. Then the central processing unit 1 accesses application software such as an OS (operating system) or spreadsheet software (hereinbelow called the "application") loaded from the auxiliary storage device 3 to the main storage device 2 to process information input from an input device 4. The processed information is output to an output device 5 or a printer 7. In the embodiment, the output device 5 is a display device, which is discriminated from the printer 7 to be categorized as the output device by definition. The input device 4 is composed of a keyboard, a pointing device and so on. The auxiliary storage device 3 may be a hard disk or magneto-optical disk or a combination of these disks. In addition, the embodiment may be such that these devices constituting the system in FIG. 1 are connected through a network.

Figure 2:
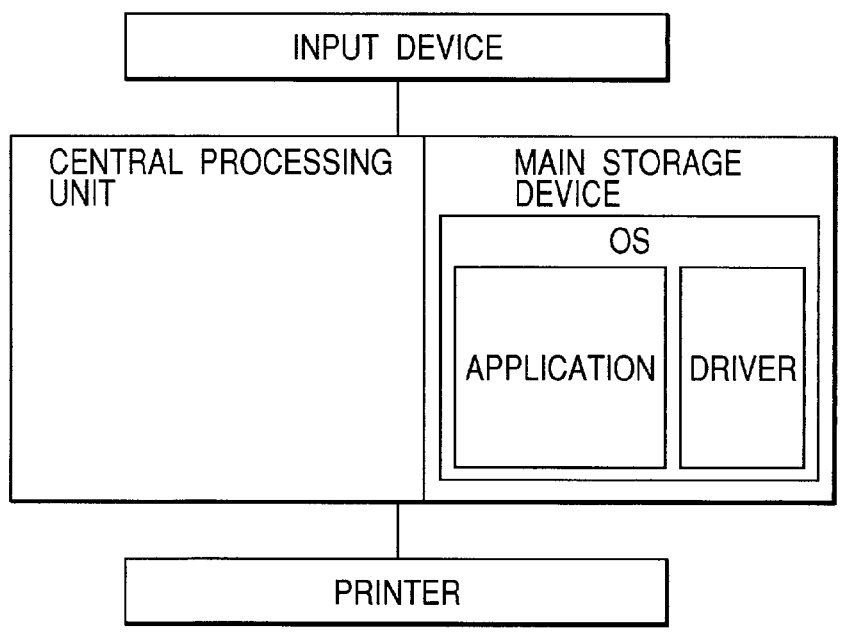
FIG. 2 is a conceptual diagram showing a flow of data from the time an image processing method control program and related data stored in a storage device of a medium reading device are read into a central processing unit until the data are sent to and printed on a printer in response to input of a print instruction from an input device.

FIG. 2 is a conceptual diagram showing a flow of data from the time the image processing method control program and related data stored in the auxiliary storage device 3 of the medium reading device 6 are read into the central processing unit 1 until the data are sent to and printed on the printer 7 in response to input of a print instruction from the input device 4. In this case, both the application and a driver function under the control of the OS.

Figure 3:
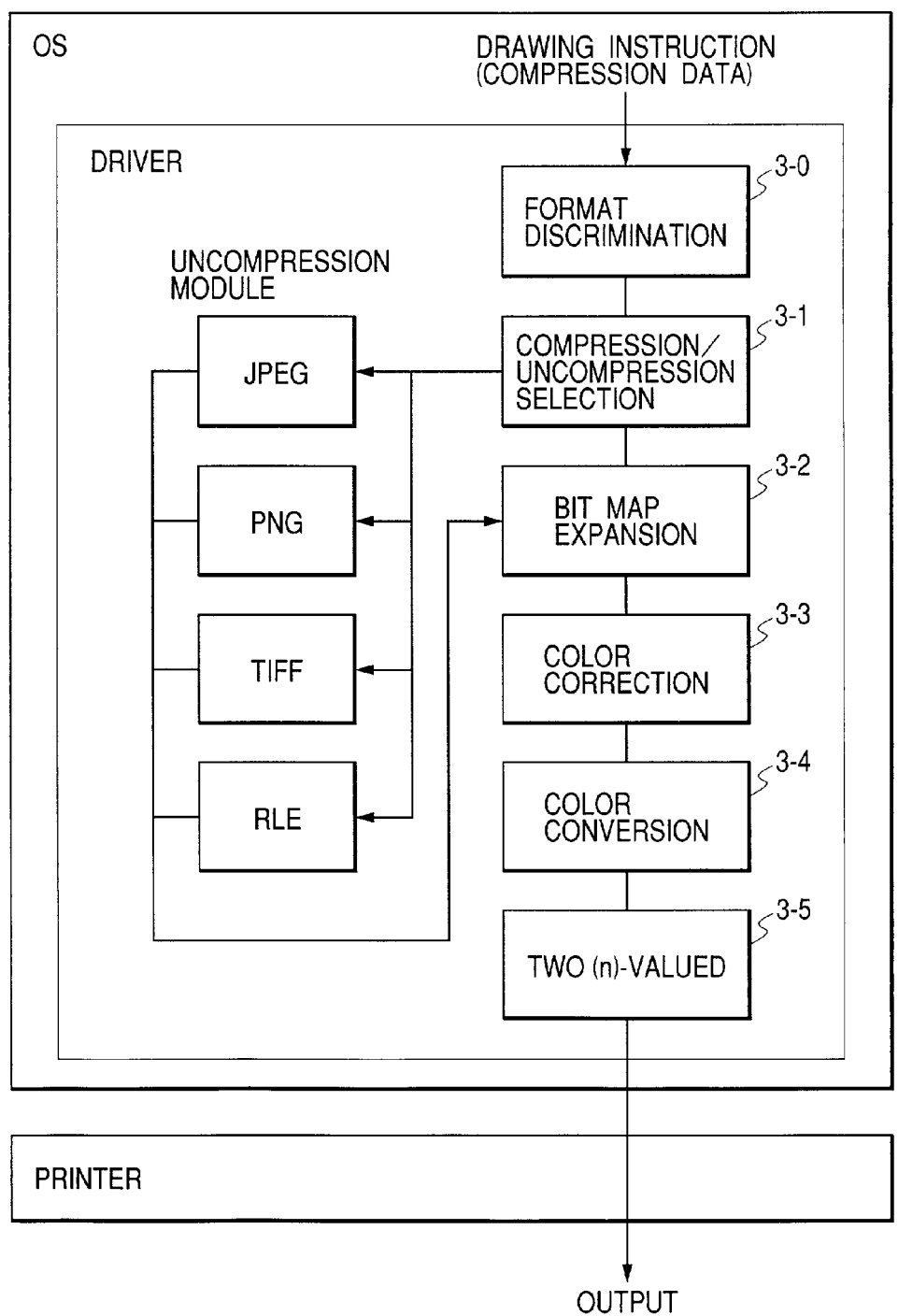
FIG. 3 illustrates details of image driver processing sections in the conceptual diagram of FIG. 2.

FIG. 3 illustrates details of image driver processing sections in the conceptual diagram of FIG. 2. The image driver designates software which runs on a host side such as a PC to develop data to a bit map in accordance with drawing instructions sent from the OS so as to transmit the developed bit map data to the printer.

When drawing instructions and compressed bit map data are sent from the OS, the image driver discriminates a format of the compressed data from the information contained in the drawing instructions (3-0 in FIG. 3). Based on the discrimination results, the image driver selects one of decompression processing methods (modules) preset or preprogrammed in the driver (3-1 in FIG. 3) to develop the compressed data to a bit map (3-2 in FIG. 3). Then the image driver judges an attribute such as a text, graphics and an image from the compression format of the data to perform color correction processing appropriate to the attribute (3-3 in FIG. 3). Subsequently, the image driver performs color conversion (3-4 in FIG. 3) and two-valued or other n-valued (3-5 in FIG. 3) processing appropriate to the respective attribute to convert the processed bit map data to a device bit map. After completion of all the processing in accordance with the drawing instructions, the device bit map is transmitted to the printer. It should be noted that the color correction may be carried out concurrently with decompression of the data, or after the data have been decompressed and developed into the bit map.

Figure 4:
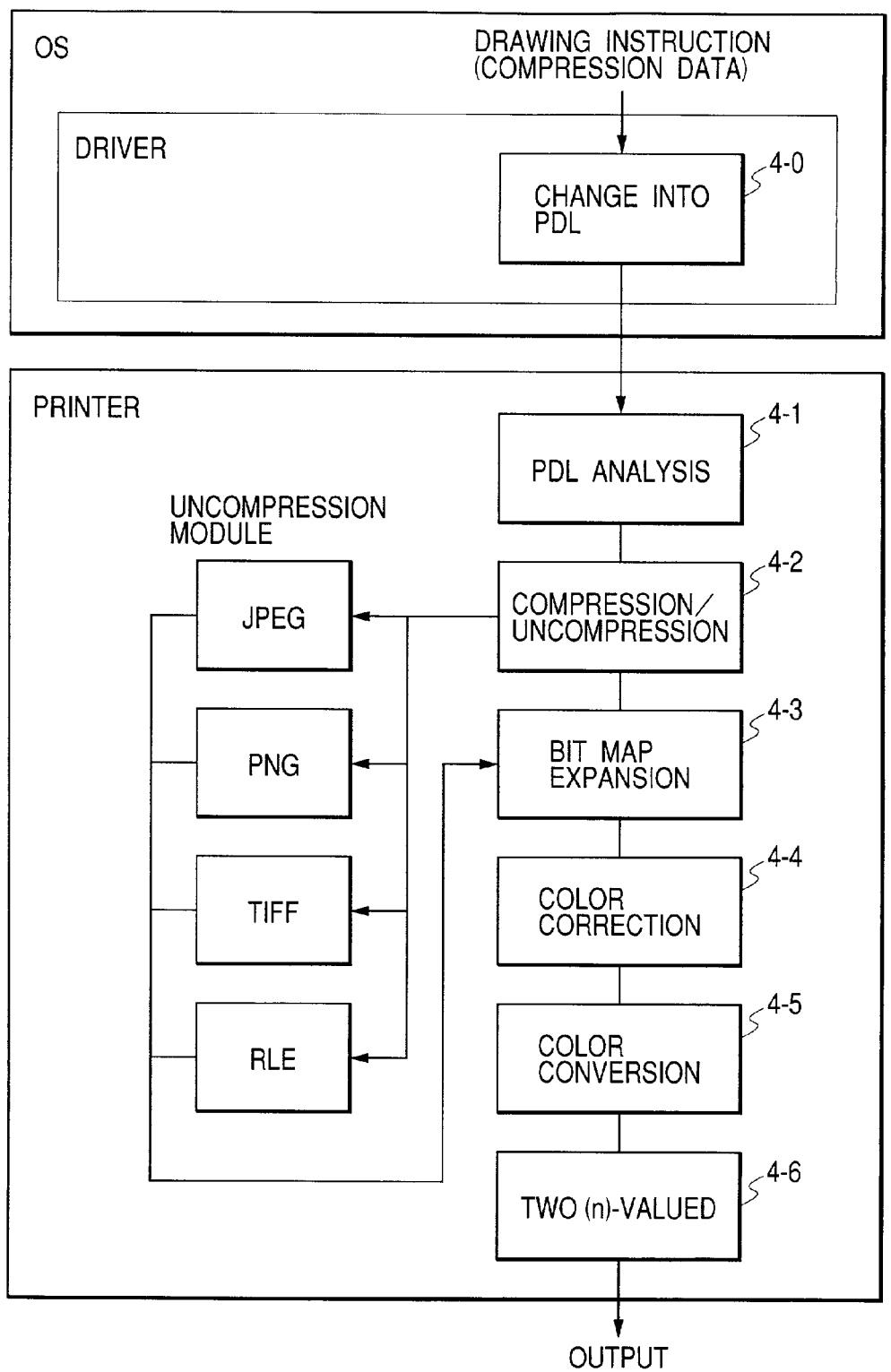
FIG. 4 illustrates details of image driver processing sections in the conceptual diagram of FIG. 2.

FIG. 4 illustrates details of PDL driver processing sections in the conceptual diagram of FIG. 2. The PDL driver designates software which runs on the host side to convert drawing instructions sent from the OS to a PDL (page-description language). The PDL is transferred to the printer and developed to a bit map inside the printer.

When the drawing instructions and the compressed bit map data are sent from the OS, the driver converts the drawing instructions to the PDL (4-0 in FIG. 4). The printer analyzes the PDL to judge a format of the compressed data from the information contained in the PDL (4-1 in FIG. 4). Then the printer selects one of decompression processing methods (modules) preset or preprogrammed as firmware of the printer (4-2 in FIG. 4) to develop the compressed data to a bit map (4-3 in FIG. 4). Next, the printer judges an attribute to the developed bit map, such as a text, graphics or a natural picture, from the compression format of the data to perform color correction processing appropriate to the attribute (4-4 in FIG. 4). Subsequently, the printer performs color conversion (4-5 in FIG. 4) and two-valued or other n-valued (4-6 in FIG. 4) processing appropriate to the attribute to convert the processed bit map data to a device bit map. After completion of all the processing in accordance with the drawing instructions, the driver notifies the printer of the completion in the form of the PDL so that the printer will transfer and print out all the bit maps on an output medium. It should be noted that the color correction processing may be carried out concurrently with decompression of the data, or after the data have been decompressed and developed to the bit map.

Figures 5, 6:
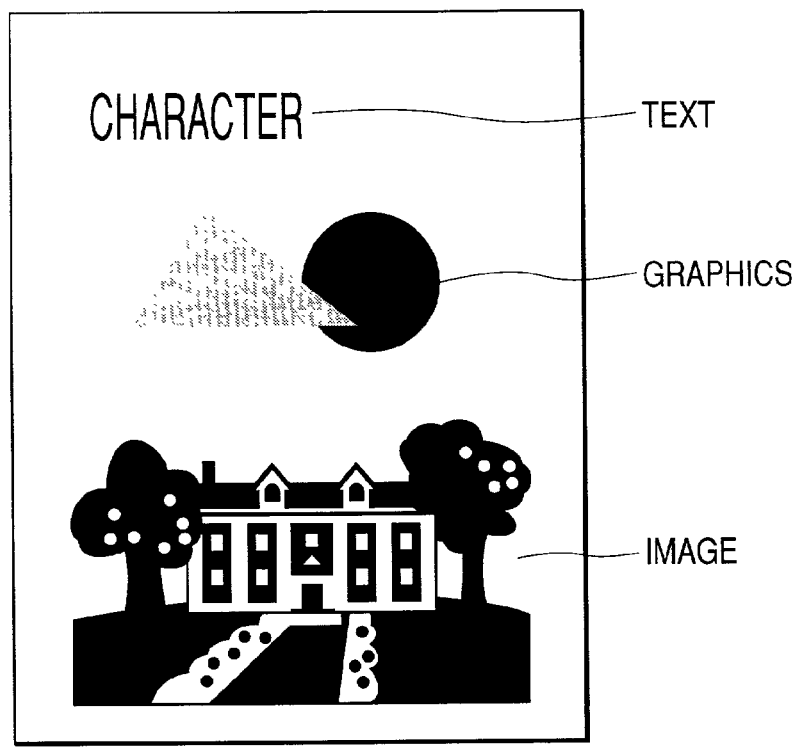
FIG. 5 is an illustration of typical print sample data, showing what data enable one to discriminate among a text, graphics and an image.
FIG. 6 is a table showing what compressed data formats are attributed to the text, the graphic and the image, respectively.

FIG. 5 is an illustration of typical print sample data, showing what data can be used to discriminate among a text, graphics and an image.

Text, as its name implies, indicates character data.

The term graphics indicates computer graphics such as a circle and a triangle shown in FIG. 5. Computer graphics includes other graphic elements such as a bar or circle graph, and a background picture for a presentation application.

The term image indicates an image taken with a digital camera or the like. The image also includes a picture and the like created with a computer-based application.

Image characteristics vary according to the attribute of the image. It is therefore necessary to change color processing, such as color correction, color conversion and two-valued or other n-valued processing, according to the characteristics of the image so as to obtain desired color reproduction. Each type of image is considered to have characteristics as follows. For example, vivid colors tend to be used in graphics. It is therefore preferable to adjust the hue, saturation and brightness of colors in the color correction and conversion processing so that proper color discrimination will be obtained in the resultant image, thereby improving (or emphasizing) the vividness of the colors. On the other hand, continuity and gradation of colors are essential to the image. It is therefore preferable to perform color correction and color conversion so that the continuity of colors will be of high quality in the resultant image. It should be noted that the system may support JPEG-2000 compressed image data as the bit map data. In this case, a JPEG-2000 compressed data decompression module is prepared in the driver or printer shown in FIG. 3 or 4 so that the JPEG-2000 compressed image will be supported as a discrimination target in the format discrimination step (3-0 in FIG. 3) or (4-1 in FIG. 4). If the JPEG-2000 compressed data is supported as the compressed bit map data, ICC profile information to be added to the JPEG-2000 compressed image can be used for color matching in the color correction and conversion processing (3-3, 3-4 in FIG. 3) or (4-4, 4-5 in FIG. 4). Such additional information is not limited to the JPEG-2000. For example, if the format is identified as Exif, shooting conditions (such as use of a flash at shooting an image in the Exif file) to be added to the Exif file may be included in the drawing instructions. In this case, when the drawing instructions are analyzed, shooting conditions are anticipated from the shooting data so that proper color processing can be performed for color correction and color conversion (3-3, 3-4 in FIG. 3) or (4-4, 4-5 in FIG. 4). For example, a cool skin color caused by firing the flash is taken off to make skin tones vivid (glow emphasis), or red eye areas surrounded by skin tones are recognized to correct the red eyes caused by firing the flash (red-eye correction).

FIG. 6 shows an example of the correspondence between attributes and data formats, that is, it shows what compressed data formats are attributed to the text, the graphics or the image types of data.

Since the image driver and the PDL driver are generally required to output high-quality images and a large amount of data needs processing, data formats which achieve more representable colors and greater compression rates are attributed to the image type.

The other data formats with a limited number of colors are attributed to the graphics or the text type.

Any method of discriminating among the attributes may be adopted, such as to discriminate among the image, the graphics and the text by analyzing the drawing instructions, or to discriminate among extensions like .jpeg and .png indicative of the type of (format) compression of image data (file) contained in the drawing instructions to identify the compressed data (format).

Figures 7, 8, 9:
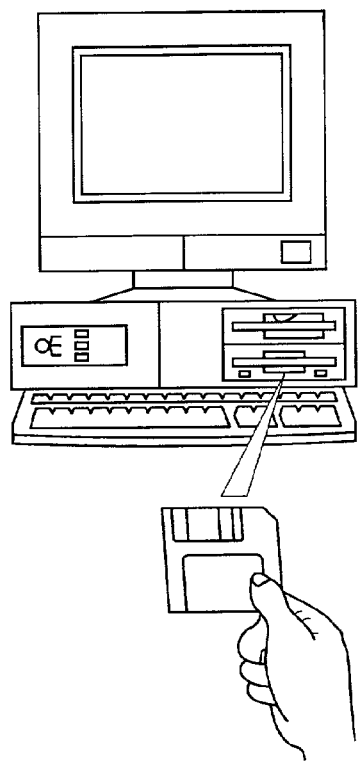
FIG. 7 shows a state in which the image processing method control program and related data are loaded into a computer through an FD(floppy disk).
FIG. 8 shows a memory map of the image processing method control program stored in the FD.
FIG. 9 shows a state in which the memory map of the image processing method control program stored in the FD is loaded from an auxiliary storage device into a main storage device through the medium reading device.

FIG. 7 shows a state in which the image processing method control program and related data are loaded into a computer through an FD. Upon setting the FD in the medium reading device, the image processing method control program and the related data are read out of the FD under the control of the OS and a basic I/O (input/output) program already read in the main storage device. The image processing method control program and the related data move to the ready state when being loaded in the main storage device.

FIG. 8 shows a memory map of the image processing method control program stored in the FD.

FIG. 9 shows a state in which the memory map of the image processing method control program stored in the FD is loaded from the auxiliary storage device into the main storage device through the medium reading device.

In the present embodiment, the image processing method control program is directly read from the FD into the main storage device through the auxiliary storage device so that the program will be executed. Alternatively, a copy of the image processing method control program may be saved from a storage medium such as the FD to the auxiliary storage device such as an HD (hard disk) so that the program will be read into the main storage device each time it is executed.

Instead of the FD or HD, other media, such as a magneto-optical disk, a CD-ROM and an IC memory card may also be used to record the image processing method control program. Further, the image processing method control program may be stored in a ROM (read-only memory).

Figure 10:
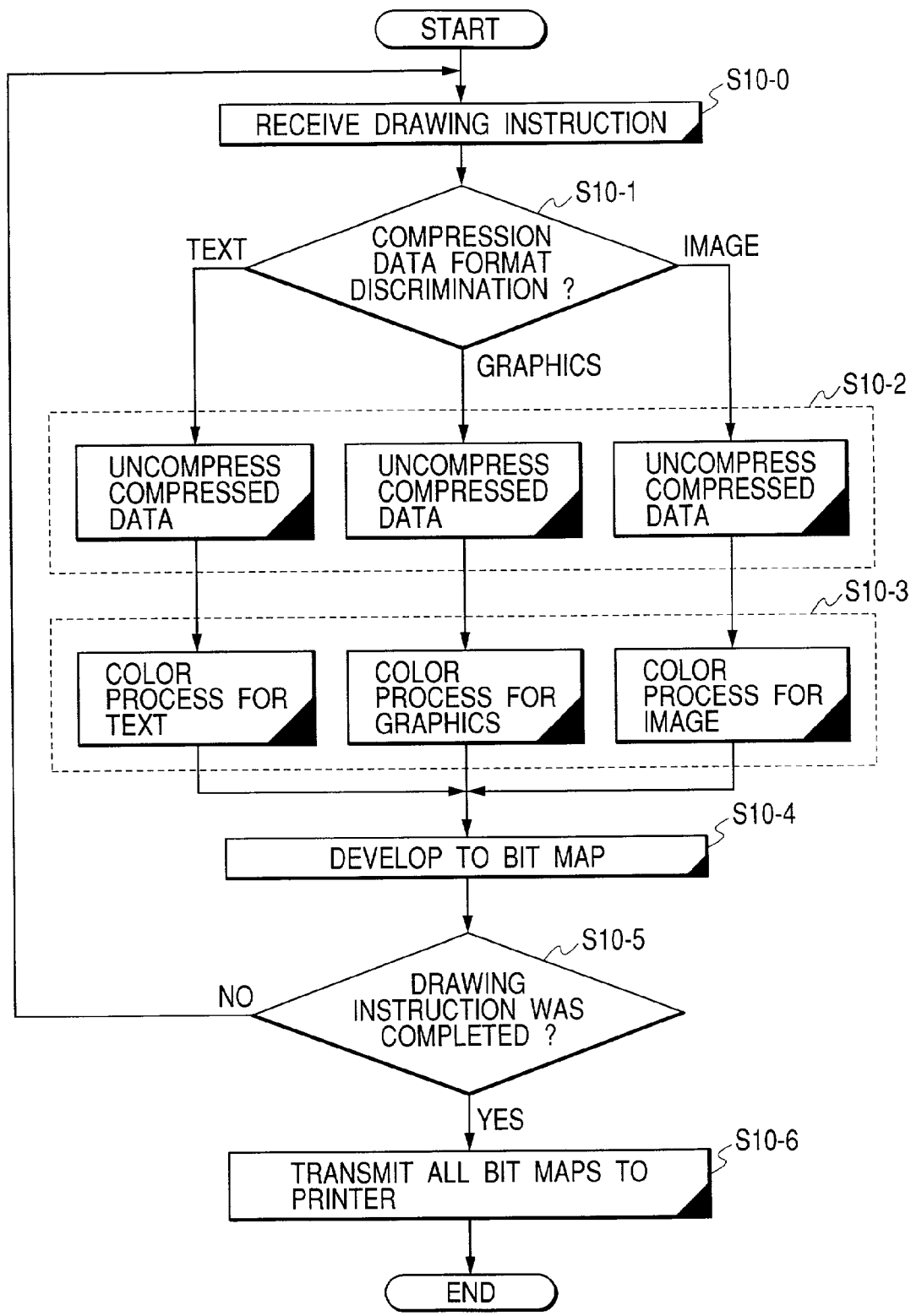
FIG. 10 is a flowchart showing an embodiment of image driver processing.
Figure 11:
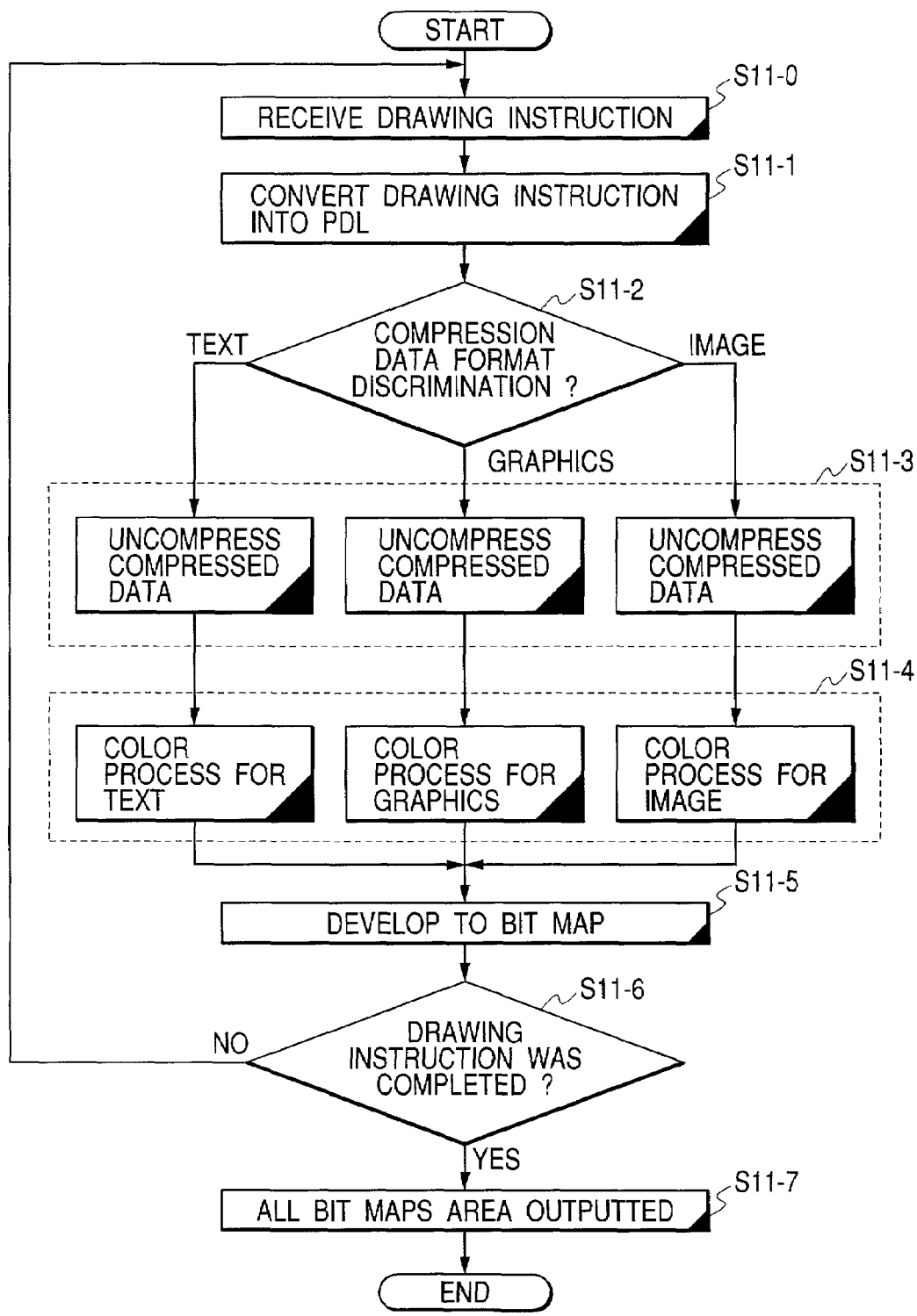
FIG. 11 is a flowchart showing an embodiment of PDL processing.

The image processing method is programmed on the basis of flowcharts of the image processing method shown in FIGS. 10 and 11.

Referring first to the flowchart of FIG. 10, an image print processing method using the image driver according to the embodiment will be described.

At first, instructions for execution of printing are input from the input device 4 (FIG. 1). Of all the OS, the driver and the application (FIG. 2) read from the auxiliary storage device 3 (FIG. 1) into the main storage device 3 (FIG. 1), the OS receives the message or the instructions. Then the OS sends the printing execution message to the application that is currently active.

The application converts the message to a command capable of being recognized by the OS to send data to be printed and the command message. Then the OS converts the message to a command capable of being recognized by the driver to send the command message.

Upon receipt of the drawing instructions (step 10-0), the driver performs compression data format discrimination among the image, the text and the graphics on the drawing instructions that contain the compressed data using a discrimination method as cited in FIG. 6 (step 10-1). Each type of compressed data is decompressed by a method suitable for the relevant compression data format (step 10-2), and color processing for color correction, color conversion and two-valued or other n-valued processing is performed on each type of expanded bit map data according to the type of compression data format identified in step 10-1 (step 10-3). Each of the processed data is developed to a bit map (step 10-4). Upon judging that all the drawing instructions have been completed (step 10-5), all the bit maps are transmitted to the printer (step 10-6).

Referring next to the flowchart of FIG. 11, an image print processing method using the PDL driver will be described.

Like in the image driver process, instructions for execution of printing are first input from the input device 4 (FIG. 1). Of all the OS, the driver and the application (FIG. 2) read from the auxiliary storage device 3 (FIG. 1) into the main storage device 3 (FIG. 1), the OS receives the message or the instructions. Then the OS sends the printing execution message to the application that is currently active.

The application converts the message to a command capable of being recognized by the OS to send data to be printed and the command message. Then the OS converts the message to a command capable of being recognized by the driver to send the command message. Upon receipt of the drawing instructions (step 11-0), the driver converts the drawing instructions to a PDL to transmit the same to the printer (step 11-1). Upon receipt of the PDL and compressed data, the printer performs compression data format discrimination among the image, the text and the graphics using a discrimination method as cited in FIG. 6 (step 11-2). Each type of compressed data is decompressed by a method suitable for the compression data format (step 11-3), and color processing for color correction, color conversion and two-valued or other n-valued is performed on each type of expanded bit map data according to the type of compression data format identified in step 11-2 (step 11-4). Then each of the processed data is developed to a bit map (step 11-5). Upon a judgment being made that all the drawing instructions have been completed (step 11-6), all the bit maps are output (step 11-7).

The above-described embodiment performed the described processing in response to input of the drawing instructions that contained compressed data. On the other hand, in a case in which the input drawing instructions contain compressed data mixing with data other than the compressed data, or image data other than compressed data, the drawing instructions are interpreted as to whether they contain compressed data. If the drawing instructions contain compressed data, a format of each compressed data is analyzed to judge an attribute of the image concerned. If the drawing instructions contain data other than compressed data, an attribute of each image is judged according to the kind of each drawing instruction in a manner as described in Japanese Patent Application Laid-Open No. 10-051651, the entire content of which is incorporated herein by reference.

For example, in the case of graphics, the image is represented by data indicative of a drawing function for drawing a figure and a color of the figure. In the case of a text, the image is represented by data indicative of a text command and a color of the text. Thus, when the data contain a drawing function for drawing a figure, it is attributed to the graphics, while when the data contain a text command, it is attributed to the text.

It should be noted that attributes of images are not limited to the above-mentioned text, graphics and image. For example, other attributes such as black characters and black-and-white images may be employed.

Other compression data formats may also be employed.

According to the above-mentioned embodiment, when an attribute of each image is determined on the basis of the kind of the drawing instruction concerned, a format of compressed data can be analyzed, thereby properly determining the attribute of data that have been identified as the image.

Further, the optimum color processing can be performed on the attribute of compressed data, which makes it possible to obtain excellent output results.

Furthermore, there is no need to decompress the compressed data and analyze the expanded bit map data, which makes possible high-speed processing without putting an excessive load on the processing. In addition, the expanded bit map data do not need analyzing, which eliminates an error of judgment associated with the analysis process and improper color processing as a result of the misjudgment.

Thus, color processing appropriate to the attribute of compressed data can be performed, and hence excellent output results can be obtained.

Compared to a method in which bit map data obtained by decompressing and expanding compressed data need analyzing, the method according to the present embodiment can process bit map data at high speed without putting an excessive load on the processing.

As described above, the present invention may be applied to a system constituted of two or more pieces of equipment (e.g., a host computer, interface equipment, a reader, a printer and so on), or a single apparatus (e.g., a copier or a facsimile).

The present invention can also be such that the features of the above-described embodiment are implemented via software by supplying program codes as shown in FIGS. 10 and 11 to an apparatus or a computer in a system connected to various devices. In this case, the implementation of the features of the above-mentioned embodiment by operating the various devices according to the program stored in the computer (CPU or MPU) of the system or the apparatus will also fall into the scope of the present invention.

Since the software program codes themselves realize the features of the above-mentioned embodiment, the program codes themselves and means for supplying the program codes to the computer, that is, a storage medium for storing the program codes, will constitute the present invention as well.

The storage medium for storing the program codes may be any storage medium such as a floppy disk, a hard disk, an optical disk, a magneto-optical disk, a CD-ROM, a magnetic tap, a nonvolatile memory card, a ROM, etc.

The features of the above-mentioned embodiment are implemented not only by execution of the program codes supplied to the computer, but also by cooperating the program cods with an OS (operating system), under which the program codes run on the computer, or other application software. In this case, the program codes, of course, are included in the embodiment of the present invention.

The supplied program codes may be stored in a memory provided on the computer's extended board or in an extended unit connected to the computer. In this case, a CPU or the like provided on the extended board or in the extended unit executes part or all the processing on the basis of the program codes to implement the features of the above-mentioned embodiment. This case is also included in the present invention.

In the above, the present invention has been described with reference to the preferred embodiment, but it is not limited to the above-mentioned embodiment, and various modifications are possible without departing from the scope of the appended claims.

It should be noted that the present invention may be applied to a system constituted of two or more pieces of equipment or to a single apparatus. The present invention can also be applied to a case where the features are achieved by supplying a program to the system or the apparatus.

What is claimed is:

1. An image processing method for performing correction processing according to an attribute of an image, comprising the steps of:
    analyzing whether compressed data contained in a drawing instruction corresponds to an image attribute, a text attribute or a graphics attribute by discriminating a format of the compressed data;
    developing the compressed data to a bit map using a method corresponding to an analysis result obtained in said analyzing step; and
    performing correction processing on the bit map according to the attribute identified on the basis of the analysis result.

2. The method according to claim 1, wherein when the drawing instruction contains a text command, the attribute of the image is identified as text.

3. The method according to claim 1, wherein when the drawing instruction contains a drawing function for drawing a figure, the attribute of the image is identified as the graphics attribute.

4. The method according to claim 1, wherein when the format of the compressed data is JPEG, the attribute of the image is identified as the image attribute.

5. The method according to claim 1, wherein the drawing instruction is described in a page-description language.

6. The method according to claim 1, wherein the correction processing includes color correction, color conversion and n-valued processing.

7. The method according to claim 1, wherein the analysis is made on the basis of information on an extension indicative of a type of compression format.

8. The method according to claim 1, wherein the correction processing is color matching using ICC profile information.

9. The method according to claim 1, wherein the correction processing is to correct skin tones.

10. The method according to claim 1, wherein the correction processing is red-eye correction.

11. A storage medium on which a program for implementing an image processing method is recorded so that correction processing is performed according to an attribute of an image, the method comprising the steps of:
    analyzing whether compressed data contained in a drawing instruction corresponds to an image attribute, a text attribute or a graphics attribute by discriminating a format of the compressed data;
    developing the compressed data to a bit map using a method corresponding to an analysis result obtained in said analyzing step; and
    performing correction processing on the bit map according to the attribute identified on the basis of the analysis result.

12. An image forming apparatus for performing correction processing according to an attribute of an image, comprising:
    analysis means for analyzing whether compressed data contained in a drawing instruction corresponds to an image attribute, a text attribute or a graphics attribute by discriminating a format of the compressed data;
    developing means for developing the compressed data to a bit map using a method corresponding to an analysis result obtained by said analysis means; and
    correcting processing means for performing correction processing on the bit map according to the attribute identified on the basis of the analysis result.

* * * * *

UNITED STATES PATENT AND TRADEMARK OFFICE
CERTIFICATE OF CORRECTION

| | | |
|---|---|---|
| PATENT NO. | : 7,127,113 B2 | Page 1 of 1 |
| APPLICATION NO. | : 09/987229 | |
| DATED | : October 24, 2006 | |
| INVENTOR(S) | : Yoshinari Ohnishi | |

It is certified that error appears in the above-identified patent and that said Letters Patent is hereby corrected as shown below:

ON TITLE PAGE AT ITEM (56) FOREIGN PATENT DOCUMENTS

"JP   08278876" should read --JP   08-278876--.

SHEET 7

FIG. 11, "AREA" should read --ARE--.

COLUMN 2

Line 40, "the" should read --"the--; and
Line 41, ""application")" should read --application")--.

COLUMN 5

Line 18, "method" should read --methods--;
Line 26, "device 3" (second occurrence) should read --device 2--; and
Line 56, "device 3" should read --device 2--.

COLUMN 7

Line 22, "tap," should read --tape,--; and
Line 26, "cods" should read --codes--.

Signed and Sealed this

Tenth Day of July, 2007

JON W. DUDAS
*Director of the United States Patent and Trademark Office*